United States Patent

Wilje

[11] 3,884,486
[45] May 20, 1975

[54] BRAKE DEVICE FOR FOOT ROLLER MEANS, IN PARTICULAR ROLLER SKIS

[76] Inventor: Sven Oscar Wilje, Sluregatan 44, S-79100 Falun, Sweden

[22] Filed: Mar. 14, 1974

[21] Appl. No.: 451,276

[30] Foreign Application Priority Data
Mar. 20, 1973 Sweden............................ 7312031

[52] U.S. Cl............... 280/11.2; 188/84; 280/11.1 R
[51] Int. Cl............................................. A63c 17/14
[58] Field of Search....... 280/11.2, 11.1 BT, 11.1 R, 280/87.04 A; 188/84, 70 R

[56] References Cited
UNITED STATES PATENTS
1,628,559   5/1927   Showers............................ 280/11.2
FOREIGN PATENTS OR APPLICATIONS
1,321,366   1963   France......................... 280/11.1 BT
409,457   1925   Germany........................... 280/11.2

Primary Examiner—Leo Friaglia
Assistant Examiner—David M. Mitchell
Attorney, Agent, or Firm—Browdy & Neimark

[57] ABSTRACT

This invention is related to a braking device for foot roller means, in particular roller skis, of the kind including a frame supporting and securing the runner's foot, and rollers or wheels provided on shafts, and brake linings or other brake elements designed for one or a plurality of the wheels to effect the braking of the roller means by moving the frame and the wheel closer to each other, wherein the wheel and the frame are movable relative to each other in an axial direction and at least one spring is provided to tend at all times to space the wheel and the frame from each other, wherein the wheel and the frame are movable to each other in order to obtain a braking action, preferably by tilting the frame relative to the running substratum or by moving the foot transversely to the running direction, against the action of the spring.

10 Claims, 6 Drawing Figures

BRAKE DEVICE FOR FOOT ROLLER MEANS, IN PARTICULAR ROLLER SKIS

BACKGROUND OF THE INVENTION

This invention is related to a brake device for foot roller means, in particular roller skis, of the kind comprising a frame supporting and securing the foot and rollers or wheels on shafts and brake linings or other brake elements designated for one or more of the wheels to effect braking of the roller means by moving the frame and wheel closer to each other.

A brake device of the kind stated above is known by the U.S. Pat. No. 3,339,936 describing a roller skate having two wheels provided under the shoe or frame, the rear one of which is, when braking, brought with its peripheral portion into contact with a brake lining disposed on the under side of the shoe, the rear portion of the shoe being pressed down toward said rear wheel. This brake device has however the serious disadvantage that braking can very easily occur against the will of the runner, since an unintentional as well as an intentional displacement of the center of gravity to the heel portion of the shoe will automatically involve that the shoe is pressed down toward the rear wheel and provide a braking. For roller means, such as roller skis, such a brake device would be inconceivable, since a depression of the heel portion of the shoe is made at each advance of the ski or at each stroke of the pole.

By the U.S. Pat. No. 939,536 a roller skate is known, having a brake device including a separate brake wheel inoperative in normal running and for the purpose of braking movable into contact with a brake lining by lifting the front portion of the skate from the running substratum while simultaneously the brake wheel is brought to bear on the substratum and pressed against the brake lining. A serious disadvantage of this brake device — in addition to its complicated structure — is the fact that the front wheel of the skate is to be lifted from the substratum to make the brake wheel come into engagement with the brake lining; something making it impossible to apply a device in connection with roller skis, wherein as known the rear wheels are spaced from the heel portion of the foot and wherein a lifting of the front wheels is excluded.

Finally a roller skate is known by the German Pat. No. 409,457, the rear wheels of which are pivotable transversely to the running direction in which action the peripheral portions of the wheels can come into engagement with brake blocks on the side pieces of the shoe or frame. This brake device entails always a change of the running direction when braking is to be effected and makes it impossible to use the roller means on courses having channel-shaped guiding grooves where the roller means is movable only in the longitudinal direction of the groove.

SUMMARY OF THE INVENTION

An object of the present invention is to eliminate the above related disadvantages of previously known brake devices and provide a brake device for foot roller means, which is simple in structure and simple and reliable to put into operation.

What primarily characterizes the brake device according to the invention is that the wheel and frame are movable relative to each other in an axial direction, i.e. transversely to the running direction of the roller means, and that at least one spring is provided to tend at all times to separate the wheel and the frame from each other, wherein for the purpose of attaining a brake action the wheel and the frame shall be moved closer to each other preferably by setting the frame at an angle relative to the running substratum or by moving the foot sideways relative to the running direction, against the action of the spring.

According to the invention the spring may be a compression spring, preferably a helical compression spring provided between the wheel and the frame.

The wheel may be fixed on the shaft, the shaft being journalled and movable in its longitudinal direction relative to the frame. On the other hand, the shaft may be fixed on the frame, the wheel being movable along the shaft in the longitudinal direction thereof.

The brake lining is preferably provided on the frame.

With reference to the appended drawings, below follows a more specific description of a number of embodiments of the invention cited as examples of the principle of the invention.

DETAILED DESCRIPTION OF THE PREFERRED EMBODIMENTS

Figures 1, 2:
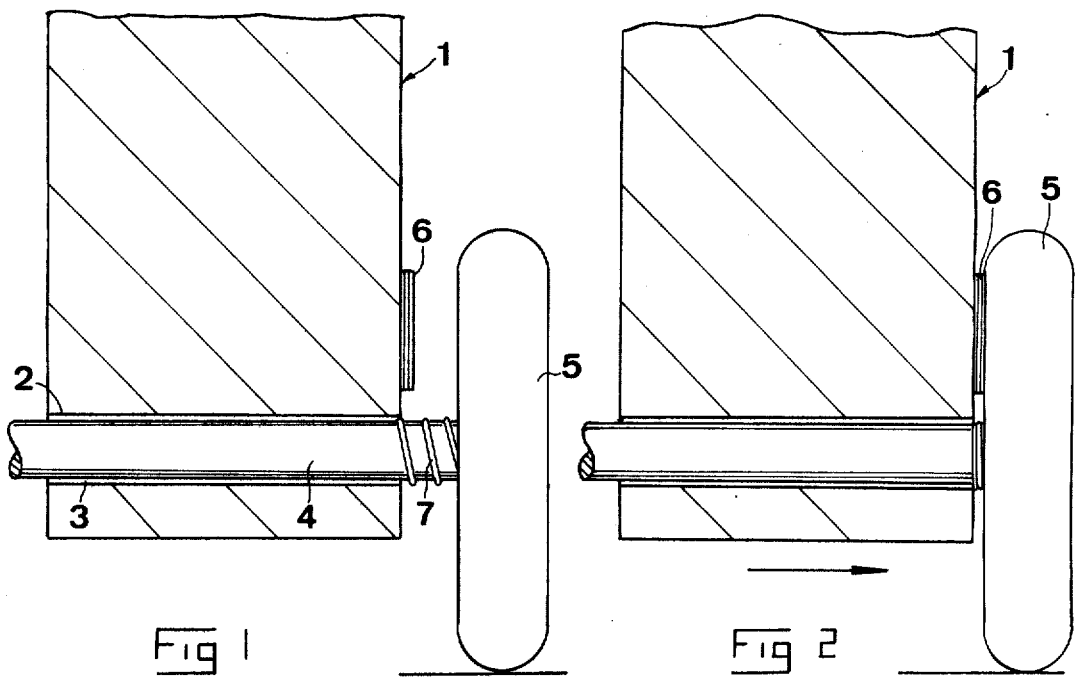
FIG. 1 is a partial sectional view of a foot roller means illustrating the invention in its simplest form with one wheel shown solely, the wheel being in a position spaced by the spring from the frame of the roller means.
FIG. 2 is a similar sectional view, showing the wheel in contact with the brake lining after moving the frame sideways relative to the running direction.
Figure 3:
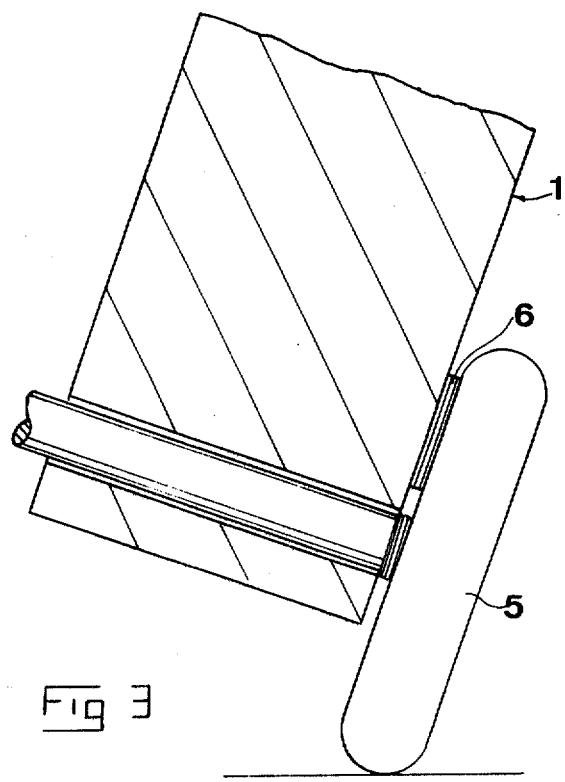
FIG. 3 is a sectional view similar to that of FIG. 2, the contact between the wheel and the brake lining however caused by tilting the frame relative to the running substratum.

In FIGS. 1–3, 1 designates generally a frame or a standing plate of a roller ski. In the frame, a mounting 2 is recessed and housing a bearing 3 and a shaft 4 directed transversely or at right angles to the running direction of the roller ski. The shaft 4 has two wheels only one of which, 5, being shown in the drawing.

On the side of the frame 1 facing the wheel 5 a brake lining 6 is provided, e.g. of the felt type. Preferably the brake lining 6 has a relatively high friction coefficient.

Figure 7:
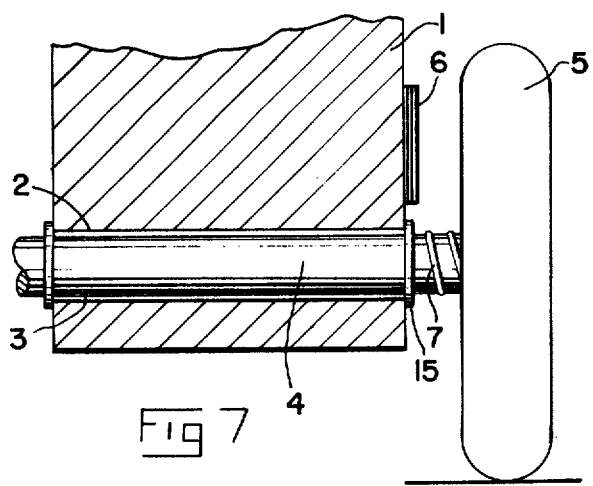
FIG. 7 shows a further embodiment of the present invention.

Between the wheel 5 and frame 1 a spring is provided in the form of a helical compression spring 7 tending at all times to space the wheel and the frames from each other so as to make the wheel adopt during normal running the position shown in FIG. 1 relative to the frame. A similar spring may also be provided at the opposite side of the frame or the opposite wheel (not shown) of the pair of wheels in question, a further brake lining similar to the brake lining 6 being possibly also provided at the opposite side of the frame. Neither the spring nor the brake lining at the opposite side of the frame are however necessary, because the opposite wheels may be spaced from the frame for instance by means of a spacer sleeve or another spacing member. In a further embodiment of the present invention shown in FIG. 7, the same elements as shown in FIG. 1 are indicated by identical reference numerals. In the embodiment of FIG. 7 the shaft 4 is rotatably mounted in bearing 3 but is prevented from moving with respect to the frame 1 in the axial direction of shaft 4 by suitable means such as flange member 15 attached to shaft 4. Wheel 5 is slidably mounted on shaft 4 by suitable means such as a journal bearing such that wheel 5 can slide along shaft 4 in the axial direction thereof. Spring 7 normally residually urges wheel 5 away from frame 1.

When the runner desires to brake whether to stop completely or to reduce the speed he acts in the manner illustrated in FIG. 2. In the embodiment of FIG. 1, the foot is moved or pressed sideways, transversely to the running direction, either inwardly or outwardly depending on where the brake lining is provided, the frame secured to the foot being displaced along the shaft 4 towards the wheel 5 against the action of the spring 7. When a lateral displacement of the foot with a sufficiently great force is carried out the inner side of the wheel 5 will come into contact with the brake lining 6, whereby an efficient brake action will be obtained. When the runner wants to cease braking he moves his foot back to a normal position wherein no side forces act on the frame, the spring 7 being free to return the frame into its position relative to the wheel 5 shown in FIG. 1. In a similar manner in the embodiment of FIG. 2 the pressure traverse to the running direction brings the brake lining 6 mounted on frame 1 in contact with the wheel 5 thereby applying braking force.

FIG. 3 illustrates contacting the wheel 5 against the brake lining 6 by tilting the frame 1 relative to the running substratum. The runner tilts the frame by means of his foot, the frame being, as a consequence of the sideways directed force component arising thereby, displaced relative to the shaft so as to bring the wheel into contact with the brake lining with its manner side, whereby braking is effected. When the braking shall cease, the frame is returned by means of the foot into a horizontal position, the spring removing, in a manner previously described, the frame into normal position relative to the wheel.

Figure 4:
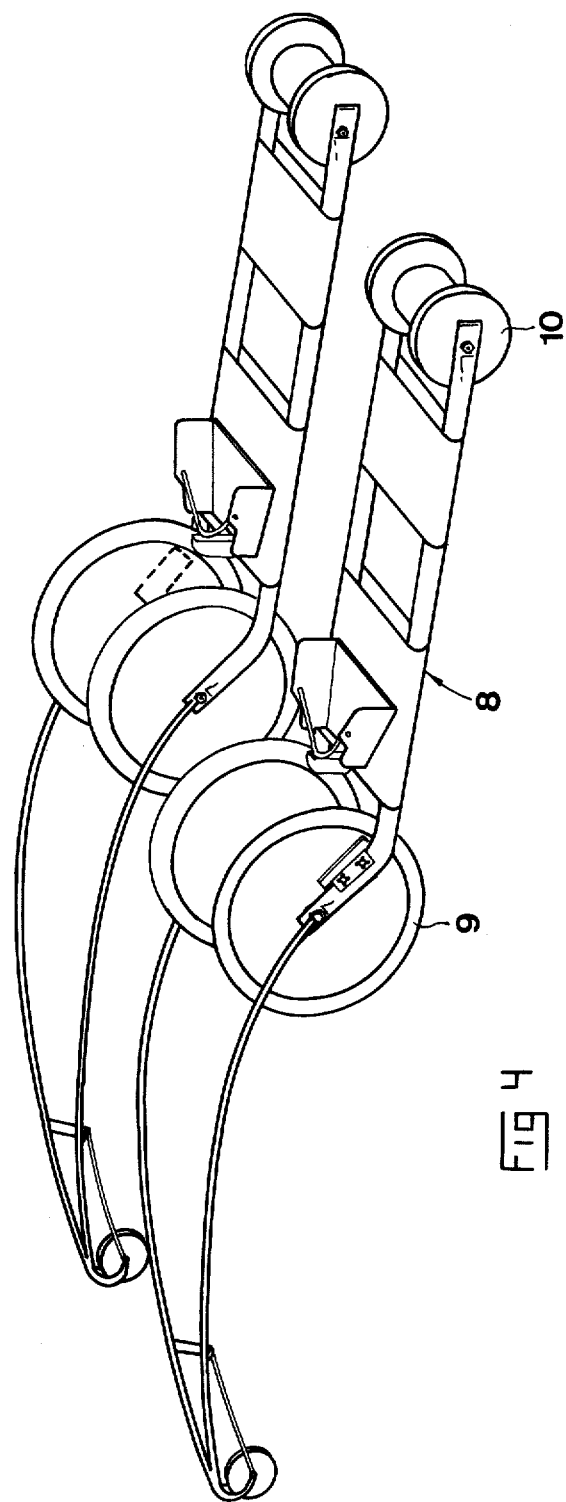
FIG. 4 is a perspective view of a pair of foot roller means in the form of roller skis.

In FIG. 4 two roller skis are shown of the type wherein the brake device according to the invention can be applied. Each of the roller skis includes a frame generally designated by 8 as well a front pair of main wheels 9 and a rear pair of main wheels 10.

Figure 5:
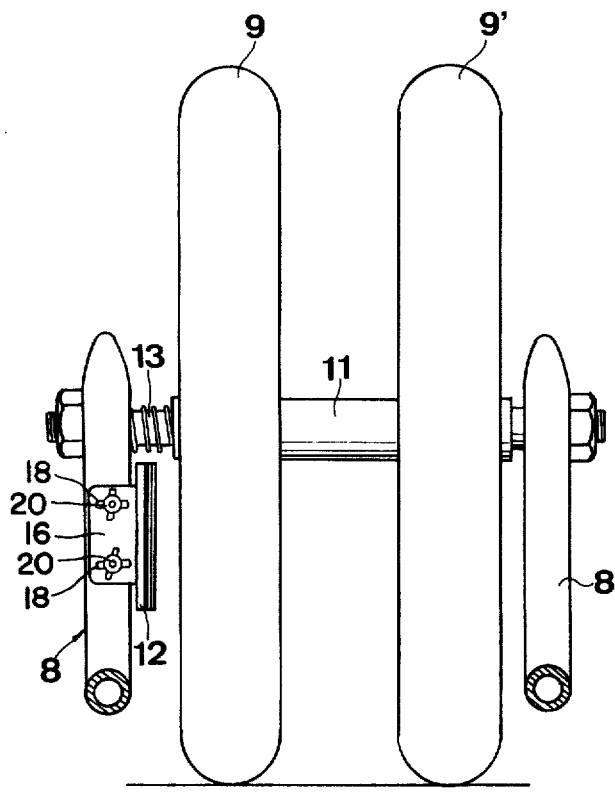
FIGS. 5 and 6 are cross sectional views through a roller ski according to FIG. 4, illustrating the brake device according to the invention in two different positions

As best shown in FIG. 5, the two front wheels 9 and 9' are journalled on a shaft 13 which is mounted and fixed to the frame 8, the wheels being displaceable longitudinally on the shaft. The spacing between the wheels 9 and 9' is maintained for instance by a sleeve 11 which possibly interconnects the two wheels.

On frame 8 is provided a brake lining 12 facing inwardly to the wheel 9 and being according to the invention adjustable and securable at different positions in relation to the wheel 9. The adjustability is in this case provided by the fact that the brake lining is provided on a bracket 16 having elongate bores 18 for attachment members in the form of finger nuts 20, the brackets 16 being movable closer to or further away from the wheel by displacement relative to the threaded bolts for the finger nuts 20 projecting through the elongate bores 18. Said adjustability is advantageous, as a light or physically less strong person can adjust the brake lining relatively close to the wheel to provide the relative movement between the wheels and the frame, while using a minimum of weight or strength. A heavy or physically strong person may adjust the brake lining at a greater distance from the wheel.

Figure 6:
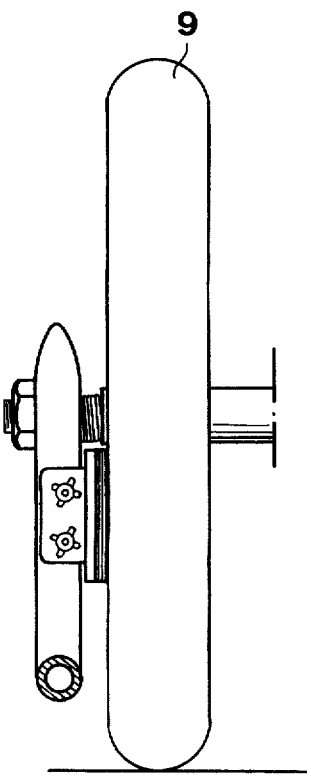

In the embodiment of the brake device shown in FIGS. 5 and 6, a brake operation is effected by displacing the frame and the shaft 13 sideways relative to the wheels 9 and 9', either by moving the foot sideways horizontally or by tilting the whole roller means in the manner described to the running substratum.

The brake device according to the invention is simple and inexpensive and permits braking in a simple and convenient manner regardless of the shape of the running substratum. Thus a braking can be made on completely planar running substrate as well as in channel-shaped grooves guiding the skis. Because braking is made by means of a simple tilting of the roller means relative to the substratum solely, natural ski running can be simulated in a striking manner in that the experienced ski runner will brake by tilting his skis in the manner outlined.

It is understood that the invention is not limited to the embodiment described and shown in the drawings. Thus, the brake device according to the invention is not limited to roller means in the form or roller skis solely, since other roller means, such as roller skates, may be concerned. Brake linings may be provided either at the front wheels or the rear wheels, or both at the front and the rear wheels. Brake linings may further be provided at each of the two wheels of a pair of wheels or at one thereof solely, as shown, either at the inner side or at the outer side of the ski or roller means. Also other modifications of the invention are conceivable within the scope of the claims.

What I claim is:

1. In a braking device for foot roller means, in particular roller skis, for movement of an object along a substrate, including a frame means, secured to and for supporting a portion of the object being rolled on the roller ski; a shaft slidably extending through a bearing on the frame; at least one wheel rotatably mounted on the shaft; and braking means cooperative with the at least one wheel for effecting braking of the foot roller means when at least one wheel contacts the braking means, the improvement including:
   the frame being slidable on the shaft in the axial direction of the shaft;
   at least one spring means, engaging the wheel and the frame, for resiliently urging the wheel away from the frame; and
   the frame being movable against the urging of said spring means to thereby bring the braking means into cooperative contact with the wheel thereby effecting braking.

2. Braking device according to claim 1, wherein said spring means is a compression spring.

3. Braking device according to claim 1, wherein the braking means is attached to the frame.

4. Braking device according to claim 3, wherein the braking means comprises a bracket adjustably mounted on the frame and a brake lining mounted on said bracket, said bracket being movable with respect to the frame such that the spacing between the brake lining and the wheel can be varied as desired.

5. Braking device according to claim 2, wherein the braking means is attached to the frame.

6. In a braking device for foot roller means, in particular roller skis, for movement of an object along a substrate, including a frame means, secured to, and for supporting a portion of the object being rolled on the roller ski; a shaft rotatably mounted in at least one bearing on the frame; at least one wheel rotatably mounted on the shaft; and braking means cooperative with the at least one wheel for effecting braking of the foot roller means when the at least one wheel contacts the braking means, the improvement including:

the at least one wheel slidably engaging the shaft thereby being movable in the axial direction of the shaft;

at least one spring means engaging the wheel and the frame for resiliently urging the wheel away from the frame; and the wheel being movable against the urging of said spring means to thereby bring the braking means into cooperative contact with the wheel thereby effecting braking.

7. Braking device according to claim 6, wherein said spring means is a compression spring, provided between the wheel and the frame.

8. Braking device according to claim 7 wherein the braking means is attached to the frame.

9. Braking device according to claim 6 wherein the braking means is attached to the frame.

10. Braking device according to claim 9, wherein the braking means comprises a bracket adjustably mounted on the frame and a brake lining mounted on said bracket, said bracket being movable with respect to the frame such that the spacing between the brake lining and the wheel can be varied, as desired.

* * * * *